March 17, 1959 R. E. CAMPBELL 2,877,789
VACUUM BREAKERS
Filed Nov. 6, 1957

INVENTOR.
ROBERT E. CAMPBELL
BY  PARKER & CARTER

ATTORNEYS

United States Patent Office 2,877,789
Patented Mar. 17, 1959

2,877,789

VACUUM BREAKERS

Robert E. Campbell, Arlington Heights, Ill., assignor to Sloan Valve Company, Chicago, Ill., a corporation of Illinois Application November 6, 1957, Serial No. 694,853

4 Claims. (Cl. 137—218)

This invention relates in general to vacuum breaker devices for use on water supply lines where there is danger of back-syphonage occurring, and the principal object of the invention is to provide a new and improved vacuum breaker for use on supply lines having relatively low rates of flow.

Another object is to design a novel vacuum breaker for use in fixtures requiring relatively low water flow rates, in which a water port and an air port are provided with a swingable check valve member arranged between the ports to close upon either of them.

A further object is to provide a vacuum breaker having a water port and an air port therein in which a new and improved valve member is arranged between the ports, which valve member is extremely sensitive upon low rates of water flow to close the air port seat to prevent leakage therefrom, and which is equally effective to close upon the water port seat in response to the occurrence of a vacuum condition in the supply line.

Other objects are to design a new and improved vacuum breaker and a valve member therefor which is comparatively simple in construction, efficient and durable in use, and is leak-proof under all conditions of use.

Vacuum breakers of the type concerned with the present invention have utility where there is danger of back flow or back-syphonage occurring in a potable water supply system from a possible source of contaminated and polluted drainage. The vacuum breakers are usually connected on the downstream side of control valves in plumbing systems where they permit flow from the pure water supply line into various kinds of plumbing fixtures, such as for example, sinks, lavatories, photo and X-ray tanks, shampoo sprays, hospital fixtures, etc. Hot water or cold water, or a mixture of both, may be passed through the device. Back-syphonage is often caused by a vacuum condition occurring in the water supply line, due to heavy withdrawals of water, or for any one of a number of other well known causes. The vacuum breaker under these conditions acts as a back-check to prevent reverse flow and in addition, admits atmospheric pressure into the plumbing fixture or its supply line to break the syphonic action.

Some known types of vacuum breakers utilize a float type of valve member arranged between the water port and the air port seats, and arranged to close upon either of them. Other known vacuum breakers provide a valve member in the form of a horizontal flat disc. These devices operated fairly well to prevent back-syphonage and leakage from the air port as long as the inlet rate of flow was not too low and there was no appreciable back pressure from the outlet side of the vacuum breaker. However, when the inlet rate was relatively low and some restriction present on the outlet side, there was a tendency for these devices to remain insecure upon their air port seats due to turbulent flow, and leakage often occurred. There was also the tendency for these valve members to wabble or rock on the air inlet seat, thereby causing annoying leakage and occasionally some water damage to equipment and floors.

The present invention entirely obviates the above difficulties by providing a new and improved vacuum breaker in which the valve member is of the pivoted swingable type that is stable under all operating conditions which may be encountered in practice. According to the present invention, the valve member comprises a wedge-shaped flexible member pivoted at its upper narrow end and so shaped as to conform generally to the spacing between the air port seat and the water port seat of the device. The valve member is preferably biased closer to the water port seat and has a projection extending into the water port in a position to be acted upon by low flow rates to render the valve member more sensitive and to assist in preventing leakage and back-syphonage.

Other objects and advantages will be more fully disclosed hereinafter and illustrated in the attached drawings in which:

Fig. 4 is a cross-sectional view of one side of the valve member and its support, while

Figure 1:
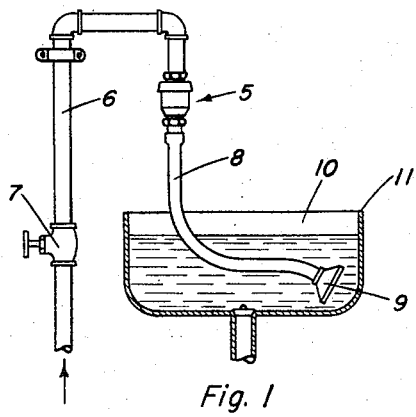
Fig. 1 is a plan view showing a use of the vacuum breaker of the invention in connection with a shampoo spray.

Referring now particularly to Fig. 1, this illustrates a vacuum breaker embodying the invention for use with a shampoo spray, for example. The vacuum breaker indicated generally at 5 is connected with a supply pipe 6 having a throttle or stop valve 7 in the line 6 for regulating the water flow rate passing through the vacuum breaker 5. At the lower or outlet end of the vacuum breaker 5 a rubber hose 8 is connected having a spray head 9 arranged at the other end. In normal practice, the hose 8 and spray head 9 may lay in the bottom of a wash bowl or lavatory 10, which is usually filled with water during the shampoo operation. The vacuum breaker 5 may be suitably mounted or supported at an elevation of at least six inches above the spill line 11 of the lavatory. Since the spray head 9 may be at times submerged in the soiled water of the lavatory 10, there is danger that back-syphonage could occur during a time when a vacuum condition exists in the potable water supply line 6. The vacuum breaker 5 interposed in this line positively prevents such back-syphonage from taking place under any condition of operation.

Figure 2:
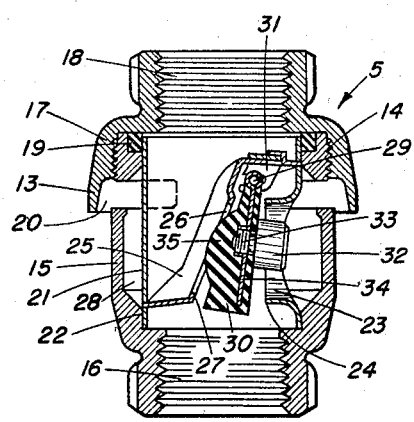
Fig. 2 is a full cross-sectional view of a preferred embodiment of the vacuum breaker of the invention.

As shown in Fig. 2, the vacuum breaker 5 is generally of a cylindrical body shape comprising a hollow casing 15 having a threaded lower end 16 for attachment of the outlet connection 8, and an upper bonnet 17 having an inner threaded portion 14 for engagement with the top threaded end of casing 15. Bonnet 17 has a threaded inlet connection 18 extending therethrough for attachment of the inlet water supply piping 6 and a lower overhanging hood portion 13 which protects the air inlets 20 from entry of any foreign substance or from blocking. The air inlets 20 are formed in casing 15 and permit entry of atmospheric pressure within casing 15. Both casing 15 and bonnet 17 are preferably made of brass. A suitable ring gasket 19 seals the threaded connection 14 between the casing 15 and bonnet 17. Each end of the device also has a nut formed thereon to facilitate attachment to the piping.

Arranged within the device as a self-contained unit is the operating mechanism. This consists of a thin tubular conduit 21 press fitted at its lower end 22 into the bottom of casing 15 and having an air inlet port 23 formed vertically in the side thereof. This air inlet port 23 has a circular air valve seat 24 formed in it which projects inward from the sides of the conduit 21. Arranged diagonally within the conduit 21 is a partition 25 having small projections on each end entering slots in opposite sides of the conduit 21 to firmly support the partition as shown. Partition 25 has a circular water port 26 formed therein which is surrounded by a water valve seat 27. It will be observed that there is a narrow space or well 28 formed between the outer wall of conduit 21 and the casing 15. This is for catching any slight drip or splash which may come from the air port 23 during operation. Both the valve seats 24 and 27 are arranged in a generally vertical position within the conduit 21, but are spaced opposite and divergent with respect to one another with the top sides of the seats closer together than the bottom sides, as shown. This provides a wedge-shaped space between the water port seat 27 and the air port seat 24 facing in the downstream flow direction of the device.

Figure 4:
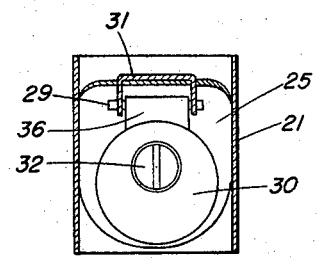
Figure 5:
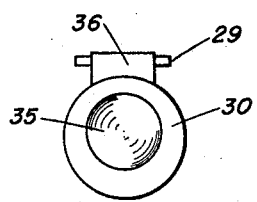
Fig. 5 is a full size view of the valve member.

A flexible valve member 30, preferably made of rubber, is pivoted on hinge pin 29 at its upper end to swing the valve member freely between the two valve seats 24 and 27. The valve member 30 is made wedge-shaped to fit generally within the space between the two valve seats. Hinge pin 29 is supported from the top end of partition 25 by a bracket 31 having depending ears with slots therein upon which hinge pin 29 pivots the valve member. The slots enable the hinge to compensate for irregularities in the facing of the valve seats. The valve member 30 is also round in shape as shown in Figs. 4 and 5 to conform to the shape of the valve seats 24 and 27 upon which it is adapted to seat in water tight engagement, as will be pointed out. At the upper end a flat integral portion 36 connects with and supports the valve member from its hinge pin 29.

As seen in Fig. 2, the valve member in its normal position is biased more closely towards the water port seat 27 than to the air port seat 24, and not in engagement with either of them. The purpose of this is to prevent sticking of the valve member to any one of the seats during long periods of use, which would render the device unreliable in operation. Freely hanging the valve member between the seats also makes it more sensitive to low rates of water flow and insures that there is a positive movement of the valve member each time water flows or a vacuum condition is present. The means for biasing the valve member toward the water port seat comprises a weight 32 having a supporting shank 33 threaded into a reinforcing plate 34. The plate 34 in turn is imbedded within the rubber valve member 30 and has its upper end encircling the pivot pin 29 to thereby provide support for the valve member. The weight 32 is positioned slightly above the center of the valve member diameter and projects somewhat into the air port opening 23. It is also provided with a screw driver slot for threading the same into plate 34.

The valve member 30 is also provided with a deflective means in the form of a rounded projecting portion 35 formed integrally with the body of the valve member and located on the opposite side of the body from the weight 32. This deflecting portion 35 projects into the water port 26 and is arranged slightly above the axial center of both the water valve seat 27 and the valve member body 30. Its normal position is such that it will be immediately acted upon by water flow no matter how slight, to deflect the same and cause swinging movement of the valve member 30, as will be explained hereinafter. The projection 35 also serves to reinforce the valve member at the area where the threaded shank 33 is located in the plate 34.

Figure 3:
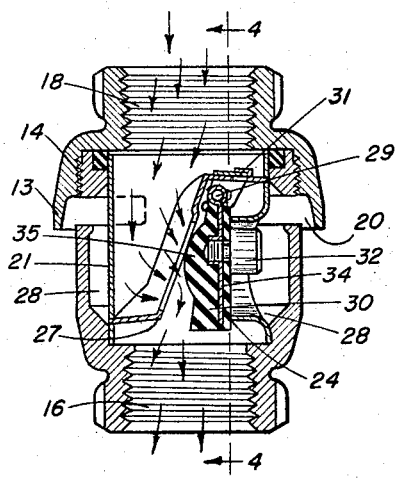
Fig. 3 is a similar view showing the vacuum breaker in one of its operated positions.

In the operation of the vacuum breaker, assume an installation as illustrated in Fig. 1 with the throttle valve 7 adjusted wide open and the spray head 9 in use and out of the lavatory 11. Under this condition, a full head of water flow takes place with only slight restriction from the spray head 9. As seen in Fig. 3, the initial flow through the device immediately strikes the deflecting portion 35 of the valve member 30 causing the valve member to swing over into engagement with the air seat 24 and sealing off the same to prevent leakage out of the air port 23. The diagonal partition 25 also serves to divert the water flow directly against the valve deflecting portion 35 and helps to firmly hold the valve member against the air port seat 24 as long as water flow takes place. With the valve member 30 swung over against the air port seat 24, there is a relatively large waterway provided through the water port seat 27 and alongside of the valve member so as not to unduly restrict or impede the free flow of water through the vacuum breaker. Upon cessation of water flow, the valve member 30 swings back to its intermediate position between the valve seats due to the gravitational action of the weight 32.

In case now that the throttle valve 7 is adjusted to provide a relatively low rate of flow through the vacuum breaker as when a person is using the spray head to "soap up," this small flow or trickle is effective to also impinge directly upon the deflecting portion 35 of the valve member 30 to immediately swing over the valve member to the air port seat. In this instance, the position of the deflecting portion 35, well within the water port 26 and in advance of the water port seat 27, is such that the water flow strikes the deflecting portion 35 prior to the time that the water can flow beyond the water port seat and downstream therefrom. In former devices, when operated in accordance with the aforesaid conditions, there was a tendency of the valve member to be drawn off of the air port seat due to the dropping column of water causing a suction action on the valve member. In addition, it was the source of an annoying noise condition due to the asperating air. This is eliminated in the present device by the use of the wedge-shaped valve member which is wide enough at its bottom end to quickly close upon air valve seat 24 while permitting sufficient flow through the water valve seat 27. Since valve member 30 conforms generally to the shape of the space between the divergent valve seats, the movement is therefore small. With such shape, also the valve member is less likely to be disturbed or pulled off its seat after it has once been moved into engagement therewith.

Assume now that during water flow through the vacuum breaker, a sub-atmospheric condition or vacuum occurs in the water supply line. With the spray head 9 submerged in the contaminated water of the lavatory 10, this water could be drawn back into the pure water supply line 6 by suction were it not for the presence of the vacuum breaker 5. Under such conditions, the valve member 30 is immediately drawn or sucked against the water port seat 27 by atmospheric pressure passing through the air openings 20 and against the right hand side of the valve member. In this position, the valve member 30 acts as a check valve. At the same time that the above action takes place, a wider opening is made between the air port seat 24 and the valve member, so that atmospheric pressure passing through air openings 20, is effective to break the vacuum condition on the downstream side of the device. Thus by the combined action of the valve member closing the water port seat and the admission of atmospheric pressure to the interior of the device, back syphonage from the submerged spray head 9 is effectively prevented.

In each instance after the valve member has been actuated by water flow or a vacuum condition, its sensitive and delicate pivoting action combined with the weight 32, results in the valve member again assuming its intermediate position between the water port and air port seats.

While only a single preferred embodiment of the invention has been described, it will be apparent variations of the same may be made by those skilled in the art, and it is therefore desired that the invention be not limited to the precise structure shown and described, but only to the scope of the appended claims.

What is claimed is:

1. In a vacuum breaker for a liquid supply system, a tubular casing having a pair of valve seats formed therein, one of said valve seats surrounding a water port and the other an air port, said valve seats being arranged opposite but at divergent angles with respect to one another so that their upper edges are closer together than the lower edges, a wedge-shaped valve member pivoted at its upper narrow end to swing between said valve seats and adapted to engage with either of said valve seats, said valve member normally hanging between and out of engagement with said valve seats and being shaped to conform generally to the space between said valve seats, a weight carried on one side of said valve member to normally bias the same closer to one of said valve seats, said weight projecting into one of said valve seat openings, and water deflecting means on the other side of said valve member projecting into the other of said valve seat openings.

2. In a vacuum breaker for a liquid supply system, a tubular casing having a water port and an air port therein and with valve seats formed around each of said ports, said valve seats being arranged opposite and at divergent angles with respect to each other so that their upper edges are closer together than their lower edges, a valve member wedge-shaped to fit generally into the space between said valve seats, said valve member being pivoted at its narrow upper end and adapted to engage with either of said valve seats but normally out of engagement with them, a weight supported on one side of said valve member and projecting into said air port for biasing said valve member from its pivot closer to said water port seat, said valve member having a water deflecting means formed on its other side projecting into said water port and in a position to be acted upon by low water flow rates through said casing to more effectively swing said valve member into engagement with said air port seat.

3. In a vacuum breaker for a liquid supply system, a tubular casing having circular water port and air port seats formed therein, said valve seats being arranged opposite but at divergent angles with respect to one another, so that their upper edges are closer together than their lower edges, a round wedge-shaped valve member arranged to fit generally in the space between said valve seats, said valve member being pivoted at its narrow upper end and adapted to engage with either of said valve seats but normally out of engagement with them, said valve member being formed of flexible material having a reinforcing plate therein forming a pivoting means on one side thereof, a weight attached to said reinforcing plate and projecting from one side of said valve member into said air port, and a water deflecting means on said valve member on the other side thereof projecting into said water port, said deflecting means comprising a rounded portion formed in said valve member and arranged closer to the top side thereof in a position to be readily acted upon by low rates of water flow through said casing to more effectively swing said valve member into engagement with said air port seat.

4. A vacuum breaker according to claim 3, in which the tubular casing is supported within a main casing having a lower portion with an outlet at its lower end and air inlets arranged around the sides thereof, a cap member threaded onto the top end of said main casing and having an inlet on the top end thereof, said cap member also having a hooded portion overhanging said air inlets, and conduit attaching means on said main casing inlet and on said cap member.

References Cited in the file of this patent
UNITED STATES PATENTS 2,302,151     Sloan et al. _____ Nov. 17, 1942